Patented Dec. 1, 1936

2,062,917

UNITED STATES PATENT OFFICE 2,062,917

POLYCARBOXYLIC ACID ESTERS

Walter E. Lawson, Woodbury, N. J., assignor to E. I. du Pont de Nemours & Company, Wilmington, Del., a corporation of Delaware No Drawing. Original application September 14, 1933, Serial No. 689,487. Divided and this application January 25, 1935, Serial No. 3,469

9 Claims. (Cl. 260—103)

This invention relates to new compositions of matter, and more particularly to polycarboxylic acid esters of unsaturated aliphatic alcohols.

This case is a division of copending application Serial No. 689,487, filed September 14, 1933.

This invention has as an object the preparation of new and useful polycarboxylic acid esters of aliphatic unsaturated alcohols. A further object is the preparation of mixed polycarboxylic acid esters of saturated and unsaturated alcohols. Further objects will appear hereinafter.

These objects are conveniently accomplished by a process which consists in reacting polycarboxylic acids of more than four carbon atoms with unsaturated aliphatic monohydric alcohols under suitable conditions and isolating the resulting products. The mixed esters are best prepared by heating together the unsaturated alcohol and the half ester of the saturated alcohol.

I have found that valuable polycarboxylic acid esters of the aliphatic unsaturated alcohols can, among other methods, be prepared by reacting the polycarboxylic acid with the unsaturated alcohols, by reacting the alkali metal salts of the polycarboxylic acids with the halides of the unsaturated alcohols, or by reacting an ester of the polycarboxylic acid with the unsaturated alcohols in the presence of a suitable catalyst. The following examples illustrate the methods of preparation of the esters.

Example 1

A mixture of 90 g. crotyl chloride, 110 g. disodium phthalate, and 3 g. dibutylamine was heated to boiling under a reflux condenser for 10 hours. The liquid portion was then distilled in vacuo, 26 grams of a product distilling between 230° and 235° C. at approximately 40 mm. pressure being obtained.

Example 2

A mixture containing 2220 g. of a mixture of crotyl and butyl alcohols (boiling range 112°–122° C.), 888 g. phthalic anhydride and 5 g. sulfuric acid was heated to boiling for six hours under a fractionating column connected to a receiver designed to separate the water and return the other constituents to the reaction vessel. More than the theoretical amount of water was removed during this period. The reaction mixture was washed with dilute alkali to remove the acid and was then distilled. The fraction boiling between 215° and 220° C. at approximately 25 mm. pressure amounted to 1175 g. This fraction had an iodine number of 50.7 and therefore contained approximately 2.7 butyl groups per crotyl group. The product was a mixture of crotyl phthalate, butyl phthalate and crotyl butyl phthalate.

Example 3

Two hundred and fifty grams of a mixture of 9, 10-octadecenyl and octadecyl alcohols, having an acetyl value of 170 and an iodine number of 53.1, and 65 grams of phthalic anhydride were heated at 170°–210° C. until the acid number dropped to 1.3 (15 hours). The product was heated to 220° C. at 16 mm. pressure to remove all volatile matter. From the iodine number of the original alcohols this derivative contains 56% 9, 10-octadecenyl ester and the remainder octadecyl ester.

The methods for the preparation of the esters described above are capable of considerable variation. The constituents of the reaction mixture may be varied, catalysts other than those mentioned may be used, or solvents may be used without the use of any catalyst.

Both simple and mixed esters of alcohols having more than six carbon atoms and preferably at least ten carbon atoms can also be made by heating lower aliphatic alcohol (e. g., methyl-butyl inclusive) esters of the dicarboxylic acids with the unsaturated alcohol or mixture thereof with a saturated alcohol in presence of an alcoholysis catalyst (e. g., sodium alcoholates, sodium, lime, litharge, and other lead oxides) and distilling off the lower alcohol.

The solvents used for carrying out the reaction should be chemically inert toward the reacting ingredients and toward the esters formed. They should also be substantially water insoluble. They need not, however, be solvents for the reacting ingredients. Suitable solvents are aromatic hydrocarbons, boiling 100°–200° C., as for instance, ethylene dichloride, chlorobenzene, cyclohexanone, etc.

Unsaturated alcohols of the kind mentioned in the examples are generally useful in the practice of my invention. I may, for instance, in addition to 9,10-octadecenyl and crotyl alcohols, use allyl, n-propenyl, n-hexenyl, n-undecylenyl, propargyl alcohols, etc. It is to be noted that these are all unsaturated alcohols of at least three carbon atoms.

Saturated alcohols which may replace the n-butyl and octadecyl alcohols in the examples include alcohols such as dodecyl, propyl, isopropyl, isobutyl, tertiary amyl, octyl, cetyl, carnaubyl, ethoxyethyl, butoxyethyl, methoxypropyl, n-decyl, and ethyl propyl carbinol.

The invention likewise can be practiced with other polybasic acids such as mellophanic, trimesic, 2,2',4,4'-benzo-phenonetetracaboxylic, naphthalic, diphenic, quinolinic, hexahydrophthalic, tetrahydrophthalic, glutaric, adipic, pimelic, sebacic, itaconic, citric, aconitic, tricarballylic, and dilactylic acids.

The products included in my invention have the formula

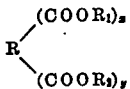

in which R is a polyvalent hydrocarbon radical having at least three carbon atoms, $R_1$ is a radical of an unsaturated normal aliphatic monohydric alcohol, $R_2$ is an alkyl or alkoxyalkyl radical of at least two carbon atoms which is different from $R_1$, $x$ is a positive number, and $y$ is a positive number the sum of $x$ and $y$ being equal to the valence of R. The most useful compounds are those in which $x$ and $y$ are both 1.

"Alkyl" as used herein does not include "alicyclic" radicals such as cyclohexyl. The description of the unsaturated alcohol as "normal" also has the conventional meaning and implies a primary alcohol without branched chains.

The esters prepared as above described vary from water white or pale amber liquids to white crystalline solids. They are insoluble in water, but are readily soluble in alcohol, acetone, ethyl acetate, butyl acetate, benzene, xylene, etc. They are compatible when mixed in equal proportions with pyroxylin and are compatible in lower ratios with other cellulose esters and ethers. My new esters are therefore valuable in the manufacture of coating and plastic compositions containing cellulose derivatives. Films containing mixtures of these derivatives, particularly those from mixtures of saturated and unsaturated alcohols, with cellulose derivatives are tough and flexible. Tests have indicated that many of these plasticizers are superior to dibutyl phthalate as regards the adhesion, flexibility, and water resistance of cellulose nitrate lacquers containing them. These plasticizers are high boiling and therefore impart substantially permanent flexibility to films in which they are used.

These new compounds may be used with resins such as dammar, ester gum, and certain synthetic resins such as polyhydric alcohol-polybasic acid resins, etc.; cellulose derivatives such as ethyl, benzyl, crotyl, allyl, dodecyl, and other cellulose ethers; cellulose nitrate, acetate, propionate, aceto-butyrate, aceto-nitrate, crotonate, stearate, and other cellulose esters, etc.

The esters disclosed herein are also valuable for the preparation of many types of compositions, which may or may not contain cellulose esters or ethers. In particular, they may be used in the preparation of lacquers for coating metal and wood; in dopes for coating fabrics, paper, etc., and in plastic compositions to be used in the preparation of toiletware, novelties, sheeting, rods, tubes, safety glass, etc. They may also be used in cellulose derivative adhesive compositions. Nitrocellulose plasticized with these esters may also be used in connection with nitroglycerin in the preparation of blasting explosives. My products are further useful as hydraulic fluids, for example on shock absorbers and brakes.

By means of the present invention plasticizers for cellulose derivatives are produced which impart superior adhesion, flexibility, and water resistance to the compositions in which they are used. Due to their low vapor pressure, products containing them are permanently flexible and have good durability.

As many apparently widely different embodiments of this invention may be made without departing from the spirit and scope thereof, it is to be understood that I do not limit myself to the specific embodiments thereof except as defined in the following claims:

I claim:

1. As a new compound an ester of a polycarboxylic acid of at least five carbon atoms wherein the hydrogen of at least one carboxyl group is replaced by the radical of an unsaturated normal aliphatic monohydric alcohol of at least three carbon atoms and the hydrogen atom of another carboxyl group is replaced by the radical of a saturated monohydric alcohol.

2. As a new composition of matter a compound having the general formula:

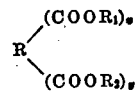

in which R is a polyvalent hydrocarbon radical having at least three carbon atoms, $R_1$ is a radical of an unsaturated normal aliphatic monohydric alcohol having at least three carbon atoms, $R_2$ is the radical of a different monohydric alcohol of at least two carbon atoms, $x$ is a positive number, $y$ is a positive number, the sum of $x$ and $y$ being equal to the valence of R.

3. As a new composition of matter a compound having the general formula:

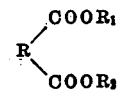

in which R is a divalent hydrocarbon radical of at least three carbon atoms, $R_1$ is a radical of an unsaturated normal aliphatic monohydric alcohol, and $R_2$ is the radical of a different monohydric alcohol of at least two carbon atoms.

4. As a new composition of matter a compound having the general formula:

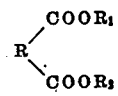

in which R is a divalent hydrocarbon radical of at least three carbon atoms, $R_1$ is the radical of 9,10-octadecenyl alcohol, and $R_2$ is the radical of a different monohydric alcohol of at least two carbon atoms.

5. As a new composition of matter a compound having the general formula:

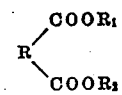

in which R is a divalent hydrocarbon radical of at least three carbon atoms, $R_1$ is the radical of crotyl alcohol, and $R_2$ is the radical of a different monohydric alcohol of at least two carbon atoms.

6. An ester of phthalic acid wherein one carboxyl hydrogen is replaced by the 9,10-octadecenyl radical and the other carboxyl hydrogen is replaced by a saturated alkyl radical.

7. An ester of phthalic acid wherein one carboxyl hydrogen is replaced by the 9,10-octadecenyl radical and the other carboxyl hydrogen is replaced by a stearyl radical.

8. An ester of phthalic acid wherein one carboxyl hydrogen is replaced by the crotyl radical and the other carboxyl hydrogen is replaced by a saturated alkyl radical.

9. An ester of phthalic acid wherein one carboxyl hydrogen is replaced by the crotyl radical and the other carboxyl hydrogen is replaced by a butyl radical.

WALTER E. LAWSON.